US008819832B2

(12) United States Patent
Li et al.

(10) Patent No.: US 8,819,832 B2
(45) Date of Patent: Aug. 26, 2014

(54) SYSTEMS AND METHODS FOR PERFORMING VULNERABILITY SCANS ON VIRTUAL MACHINES

(75) Inventors: Richard D. Li, Somerville, MA (US); Jeffrey L. Berger, Belmont, MA (US); Anastasios Giakouminakis, Los Angeles, CA, MA (US)

(73) Assignee: Rapid7, LLC, Boston, MA (US)

( * ) Notice: Subject to any disclaimer, the term of this patent is extended or adjusted under 35 U.S.C. 154(b) by 0 days.

(21) Appl. No.: 13/218,705

(22) Filed: Aug. 26, 2011

(65) Prior Publication Data

US 2013/0055398 A1    Feb. 28, 2013

(51) Int. Cl.
*G06F 12/14* (2006.01)
*G06F 11/00* (2006.01)
*G06F 12/16* (2006.01)
*G08B 23/00* (2006.01)

(52) U.S. Cl.
USPC ......... 726/25; 726/1; 726/22; 726/23; 726/24

(58) Field of Classification Search
None
See application file for complete search history.

(56) References Cited

U.S. PATENT DOCUMENTS

| 7,802,302 B1* | 9/2010 | Nagarkar et al. | 726/24 |
| 8,099,786 B2* | 1/2012 | Maynard | 726/25 |
| 2008/0263658 A1* | 10/2008 | Michael et al. | 726/22 |
| 2010/0199351 A1* | 8/2010 | Protas | 726/25 |
| 2012/0072968 A1* | 3/2012 | Wysopal et al. | 726/1 |
| 2012/0096550 A1* | 4/2012 | Sapuntzakis et al. | 726/23 |

\* cited by examiner

*Primary Examiner* — Shin-Hon Chen
(74) *Attorney, Agent, or Firm* — MH2 Technology Law Group, LLP

(57) ABSTRACT

Embodiments described herein relate to systems and methods for performing vulnerability scans on virtual machines. The systems and methods comprise a virtual asset tool that can instantiate a vulnerability scanner on a physical machine hosting a set of virtual machines. The vulnerability scanner can scan the virtual machines to identify any vulnerabilities, security flaws, or other risks, and can provide a result of the scan to the virtual asset tool. In embodiments, the virtual asset tool can examine the result of the scan to identify any vulnerabilities resulting from the scan.

30 Claims, 6 Drawing Sheets

SYSTEMS AND METHODS FOR PERFORMING VULNERABILITY SCANS ON VIRTUAL MACHINES

CROSS-REFERENCE TO RELATED APPLICATIONS

This application is related to the following United States Patent Application:

Systems and Methods for Identifying Virtual Machines in a Network, U.S. application Ser. No. 13/218,606, invented by Richard Li, Jeffrey Berger, and Anastasios Giakouminakis, assigned to Rapid7, LLC, and filed concurrently herewith.

The above referenced application is incorporated herein by reference in its entirety.

FIELD

This application relates to network efficiency.

BACKGROUND

In virtualized computing networks and related systems, a set of virtual machines is hosted by a set of physical machines. The virtual machines are software implementations that are configured to execute various programs, such as applications and operating systems, like a physical machine. The software running on a virtual machine is limited to the resources and abstractions provided by the virtual machine.

Entities such as corporations, individuals, or other organizations are increasingly using virtualization services in various computing infrastructures. For example, as more server workloads are being virtualized, the average virtual machine VM)-to-host ratio is increasing. The increases can create difficulties for virtualization managers who manage and oversee virtual machine operation. Further, the entities that employ the virtualization services are not able to dynamically receive updates to virtual machines and/or the host physical machines. As such, the entities may not always have a current snapshot of the virtualization infrastructure.

In addition, a virtualized infrastructure can introduce a new set of security risks, and vulnerabilities in various components, such as hypervisors, can impact more than one device or resource. Some of the additional security considerations that have been identified in virtualized infrastructures include offline images, hypervisor attacks, VM proliferation, virtual networks, virtual storage, larger impact of failure, blurring of responsibilities, and others. Further, as virtualization technologies become more widely deployed, the number and severity of disclosed vulnerabilities has climbed steadily. Further still, a virtualized environment is highly dynamic and, from a security perspective, the risks are ever-changing.

A need, therefore, exists for administrators or other entities to understand the security risks of their virtual environment at any point in time. Further, a need exists to perform vulnerability scans on virtual machine networks to detect and remedy vulnerabilities, security holes, and other risks.

BRIEF DESCRIPTION OF THE DRAWINGS

The accompanying drawings, which are incorporated in and constitute a part of this specification, illustrate embodiments of the disclosure and together with the description, serve to explain the principles of the disclosure. In the figures.

Figure 1:
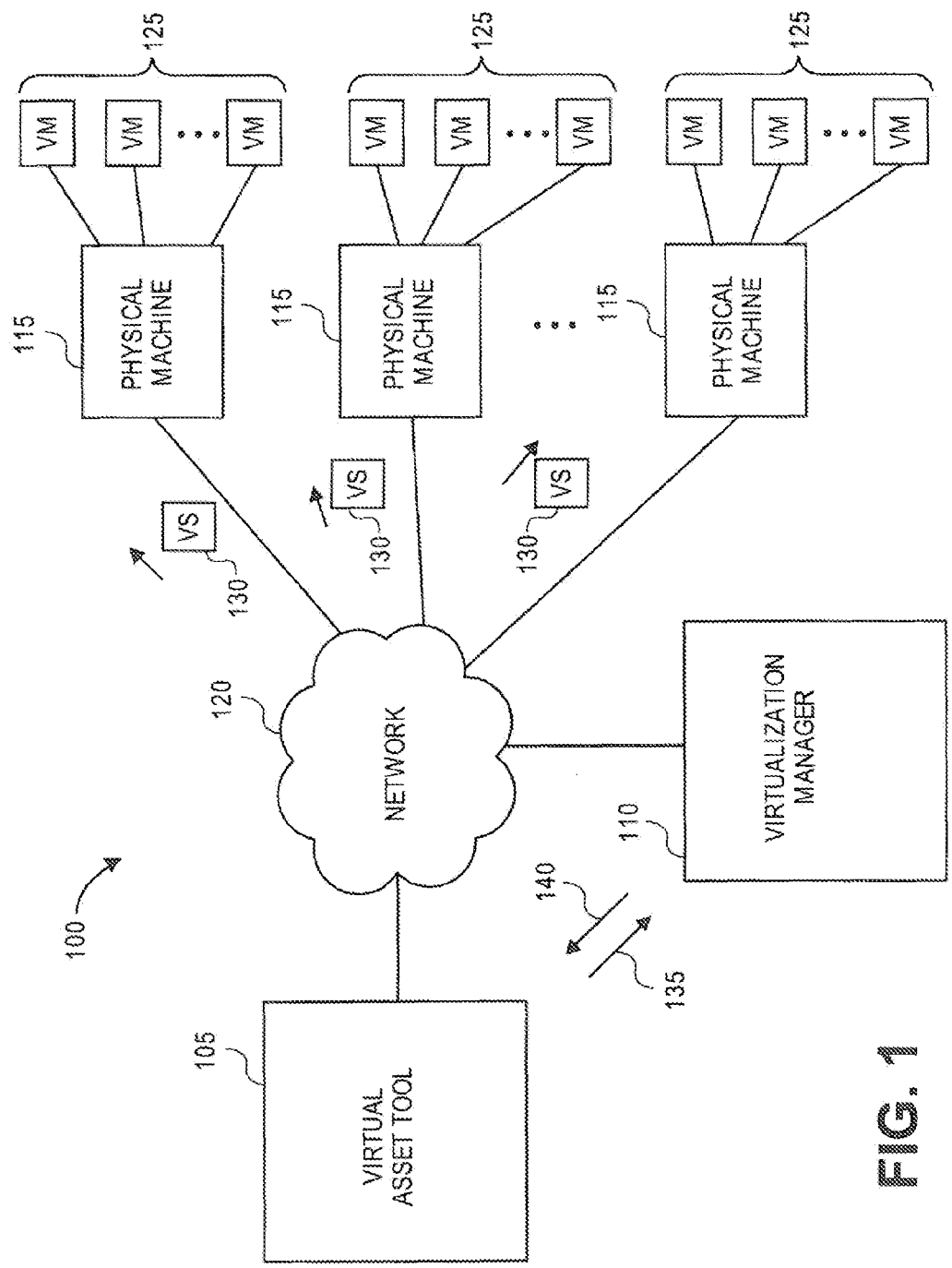
FIG. 1 is block diagram of an exemplary environment in which a virtual asset tool can interface with a virtualization infrastructure, according to various embodiments.

It should be noted that some details of the drawings have been simplified and are drawn to facilitate understanding of the embodiments rather than to maintain strict structural accuracy, detail, and scale.

DETAILED DESCRIPTION

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific exemplary embodiments. Electrical, mechanical, logical and structural changes may be made to the exemplary embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for receiving updates associated with changes in a virtualization infrastructure. Further, embodiments of the present teachings relate to systems and methods for performing vulnerability scans of resources, such as virtual machines, of the virtualization infrastructure. In particular, an owner or administrator associated with a virtualized system can desire to dynamically receive the updates, and automatically schedule and perform vulnerability scans of the resources in response to the updates or other triggers.

A virtual asset tool can be configured to interface with a virtualization manager and a virtualized system comprising physical machines and virtual machines (VM). The virtual asset tool can query the virtualization manager which can provide, to the virtual asset tool, metadata comprising information identifying the VMs and the associated physical machines. The virtual asset tool can store the metadata as part of an asset record, as well as identify updates to one or all of the virtual machines, or general updates or changes to the virtualized system. When a change or update to an associated VM or other component is detected, then the virtualized manager can be configured to provide the update to the virtual asset tool. The virtual asset tool can be configured to update the appropriate asset record in accordance with the update received from the virtualized manager. It should be appreciated that the virtual asset tool can be configured to receive or detect updates and/or other information according to various techniques. For example, the virtual asset tool can subscribe, or variations thereof, to the updates, whereby the virtualization manager can provide the updates as they become available. For further example, the virtual asset tool can periodically "poll," or variations thereof, for any updates, whereby the virtual asset tool can receive updates if there are any available.

In embodiments, the virtual asset tool can be configured to initiate a vulnerability scan of the virtual machines. In particular, the virtual asset tool can be configured to instantiate a vulnerability scanner in each of the physical machines, wherein the vulnerability scanner can be configured to scan the associated VMs for vulnerabilities, security holes, and other risks. In embodiments, the vulnerability scanner can be "pinned" to an associated physical machine. Once the vulnerability scanner performs a scan on the VMs of the respective physical machine, the vulnerability scanner can be configured to provide a result of the scan to the virtual asset tool, which can examine the result of the scan to identify any vulnerabilities in the associated VMs.

If a vulnerability is identified, the virtual asset tool can be configured to determine a solution or remedy to address the identified vulnerability, and implement the solution to correct the identified vulnerability. The systems and methods as described herein can allow a user or administrator to quickly identify any updates associated with the virtualized infrastructure. Still further, by pinning a vulnerability scanner, or a VM running the vulnerability scanner, to a single physical machine, the vulnerability scanners can avoid having to send packets of data via a network.

FIG. 1 illustrates an exemplary environment 100 in accordance with embodiments as described herein. While FIG. 1 illustrates various components contained in the environment 100, one skilled in the art will realize that these components are exemplary and that the environment 100 can include any number and type of components.

The environment 100 can comprise a virtual asset tool 105 that can be configured to perform functions and execute applications as discussed herein such as, for example, subscribing to updates, identifying vulnerabilities, and others. The virtual asset tool 105 can be configured as an application program that is capable of being stored on and executed by a computing system, whether part of the environment 100 or external to the environment 100. For example, the virtual asset tool 105 can be an application program such as NeXpose™ or Metasploit™ from Rapid7, LLC. The virtual asset tool 105 can be written in a variety of programming languages, such as JAVA, C++, Python code, Visual Basic, hypertext markup language (HTML), extensible markup language (XML), and the like to accommodate a variety of operating systems, computing system architectures, etc.

The virtual asset tool 105 can be configured to interface with a network 120 such as the Internet. It should be appreciated that the network 120 can comprise any type of wired or wireless data communication network. The environment 100 can further comprise a virtualization manager 110 that can also interface with the network 120. The virtualization manager 110 can be a software entity, application, module, application programming interface (API), or any component or combination of hardware resources, that can be configured to build, scale, instantiate, manage, and/or otherwise interface with a network of physical and virtual machines. Further, the virtualization manager 110 can provide solutions in end-user computing, application, infrastructure and operations, IT business management, and other fields. Further, the virtualization manager 110 can be configured as an application program that is capable of being stored on and executed by a computing system, whether part of the environment 100 or external to the environment 100. For example, the virtualization manager 110 can be an application program such as vCenter™ from VMware®, Inc. The virtualization manager 110 can be written in a variety of programming languages, such as Java, C++, Python code, Visual Basic, hypertext markup language (HTML), extensible markup language (XML), and the like to accommodate a variety of operating systems, computing system architectures, etc. The virtual asset tool 105 can be configured to communicate or interface with the virtualization manager 110 directly, via the network 120, or via other communication channels.

Referring to FIG. 1, the environment 100 can further comprise a set of physical machines 115 that can interface with the virtual asset tool 105 and the virtualization manager 110 via the network 120 or other channels. The physical machines 115 can be any computing resources such as computers, servers, hosts, storage, and other resources, and can comprise any type of hardware or software components. Each of the physical machines 115 can be configured to host one or more virtual machines (VM) 125. In particular, the VMs 125 can be any software implementation of a machine or computer that can execute a program or application using underlying hardware of the respective physical machine 115. In embodiments, the VMs 125 can be system VMs capable of executing a complete operating system (OS) or process VMs capable of executing one or more programs or applications. It should be appreciated that the number, type, functionality, and extent of each of the VMs 125 can vary based on the underlying physical machine 115, any requirements, or other factors.

The virtualization manager 110 can be configured to manage the sets of VMs 125 hosted on the physical machines 115. In particular, the virtualization manager 110 can maintain an inventory or the like of each of the VMs 125 that are hosted on the specific physical machines 115. For example, the inventory can detail the types, amounts, functions, hosting information, and other data associated with the VMs 125 and the physical machines 115. According to embodiments, the virtual asset tool 105 can request a listing or inventory of the VMs 125 hosted by the physical machines 115. For example, the virtual asset tool 105 can submit an inventory query 135 to the virtualization manager 110 via the network 120. Upon receipt of the request from the virtual asset tool 105, the virtualization manager 110 can identify which of the VMs 125 are currently hosted by which of the physical machines 115, and can provide a listing 140 or indication of the appropriate VMs 125 and physical machines 115 to the virtual asset tool 105. In embodiments, the listing can comprise metadata that can describe or uniquely identify the VMs 125, the physical machines 115, or components associated therewith, such as hypervisors and other resources. Further, the metadata can indicate functions associated with the components such as, for example, which operating systems that the VMs 125 are running, as well as names, network addresses, dates, and other data.

Figure 2:
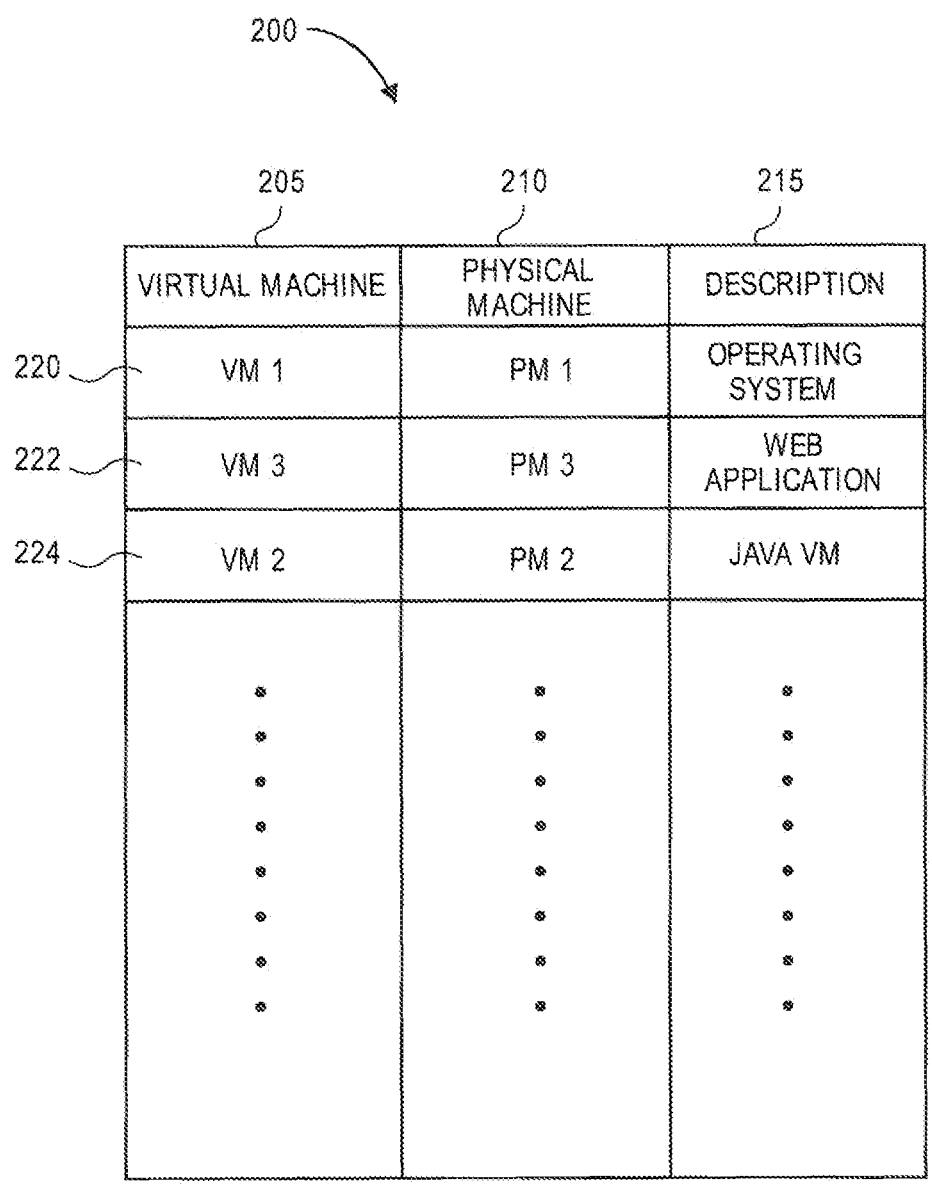
FIG. 2 is a depiction of an exemplary asset record, according to various embodiments.

The virtual asset tool 105 can store the metadata or other information received from the virtualization manager 110 in a database, repository, or similar type of local or remote storage. For example, the metadata or other information can be stored as an asset record or similar type of data record. Referring to FIG. 2, depicted is an exemplary asset record 200 that can be stored by the virtual asset tool 105. The asset record 200 can comprise a listing 205 of the VMs, a listing 210 of which physical machines are hosting the VMs, and a description 215 of each of the VMs 205.

As shown in FIG. 2, a first entry 220 indicates that "VM 1" is hosted in physical machine "PM 1" and is configured to support the execution of an operating system. Similarly, a second entry 222 indicates that "VM 3" is hosted on "PM 1" and is configured to support the execution of a web application. Further, a third entry 224 indicates that "VM 2" is hosted on "PM 2" and is configured as a Java® virtual machine. It should be appreciated that the asset record 200 and the associated entries 220, 222, 224 are merely exemplary and can comprise fewer or greater numbers of entries, and other types of data.

Referring back to FIG. 1, the virtual asset tool 105 can be configured to identify and/or receive updates or changes in the configuration or setup of the VMs 125 and/or the physical machines 115. For example, an update can comprise the removal or shut down of an existing VM 125, or the instantiation of a new VM 125. For further example, the update can comprise a change or modification to a VM 125. Further, for example, the update can comprise an addition of a new physical machine 115 to the virtualization system. It should be appreciated that other updates or changes to the VMs 125 or the physical machines 115 are envisioned. Further, it should be appreciated that the virtual asset tool 105 can identify and/or receive changes associated with specific VMs 125 or physical machines 115. In embodiments, the virtual asset tool 105 can subscribe, or variations thereof, to the updates, whereby the virtualization manager 110 can provide the updates as they become available. In further embodiments, the virtual asset tool 105 can periodically "poll," or variations thereof, for any updates, whereby the virtual asset tool 105 can receive updates if there are any available.

Upon a change or update to an applicable VM 125 or physical machine 115, the virtualization manager 110 can be configured to notify or otherwise inform the virtual asset tool 105 according to any subscriptions of the virtual asset tool 105. For example, if the virtual asset tool 105 is subscribed to updates associated with any of the VMs 125, and a new VM 125 is instantiated in one of the physical machines 115, then the virtualization manager 110 can be configured to notify the virtual asset tool 105 of the instantiation.

When the virtual asset tool 105 is subscribed to updates or changes, the virtual asset tool 105 can receive the updated metadata from the virtualization manager 110 when there is a corresponding update or change. Further, the virtual asset tool 105 can update any associated asset records or other data. For example, if one of the VMs 125 switches processing functions, then the virtual asset tool 105 can receive an update of the change from the virtualization manager 110, and modify the associated entry of the asset record to reflect the new processing function. For further example, when a new, VM 125 is added to one of the physical machines 115, then the virtual asset tool 105 can receive a notification of the addition from the virtualization manager 110, and create a new entry of the asset record to reflect the addition. It should be appreciated that other updates, additions, modifications, changes, and the like, are envisioned.

In embodiments, the virtual asset tool 105, the virtualization manager 110, or other entities can use the updates received from the subscriptions to perform other functions. For examine, the virtual asset tool 105 can analyze the updates and make appropriate changes associated with improving processing and efficiency. For further example, the virtual asset tool 105 can use the updates to schedule vulnerability scans of the VMs. Further, for example, the virtual asset tool 105 can examine the metadata and identify common properties or other data. For example, the metadata can comprise identifications of two or more of the VMs 125 that each execute a web application. The virtual asset tool 105, the virtualization manager 110, or other entities can group the corresponding VMs 125 that share a common property into a subgroup, cluster, or the like. For example, any VMs 125 that execute a web application can be organized into a subgroup of web application-executing VMs. The virtual asset tool 105 can exchange any subgroupings with the virtualization manager 110, and vice-versa.

According to embodiments, a virtualized infrastructure, such as that of the environment 100, can introduce security risks, and vulnerabilities in various components, such as hypervisors, can impact more than one resource. For example, security gaps can exist in offline images, hypervisor attacks, VM proliferation, virtual networks, virtual storage, larger impact of failure, blurring of responsibilities, and others. According to embodiments, a vulnerability scanner 130 can be provided to each of the physical machines 115 to scan for vulnerabilities, security gaps, and other risks.

In particular, the virtual asset tool 105 can be configured to deploy the vulnerability scanner 130 to each of the physical machines 115 via, for example, an API associated with the virtualization manager 110. The API can use information obtained during a discovery or identification of the physical machines 115. It should be appreciated that the vulnerability scanner 130 can be any type of application, program, source code, or the like that can execute on underlying hardware of the physical machines 115. Further, the vulnerability scanner 130 can operate as a virtual machine in the underlying physical machine. In embodiments, a single vulnerability scanner 130 can be deployed to each of the physical machines 115. The vulnerability scanners 130 can be configured to scan each of the virtual machines 125 that are hosted by the respective physical machine 115. For example, if one of the physical machines 115 hosts four (4) virtual machines 125, then the vulnerability scanner 130 can scan the four (4) virtual machines 125 for any security gaps, risks, threats, and the like. In embodiments, the vulnerability scanner 130 can be deployed in response to receiving an update from the virtualization manager 110. For example, if a new physical machine 115 is added to the virtualization infrastructure, then a new vulnerability scanner 130 can be deployed to or instantiated in the new physical machine 115. It should be appreciated that other deployment or instantiation techniques are envisioned.

Figure 3:
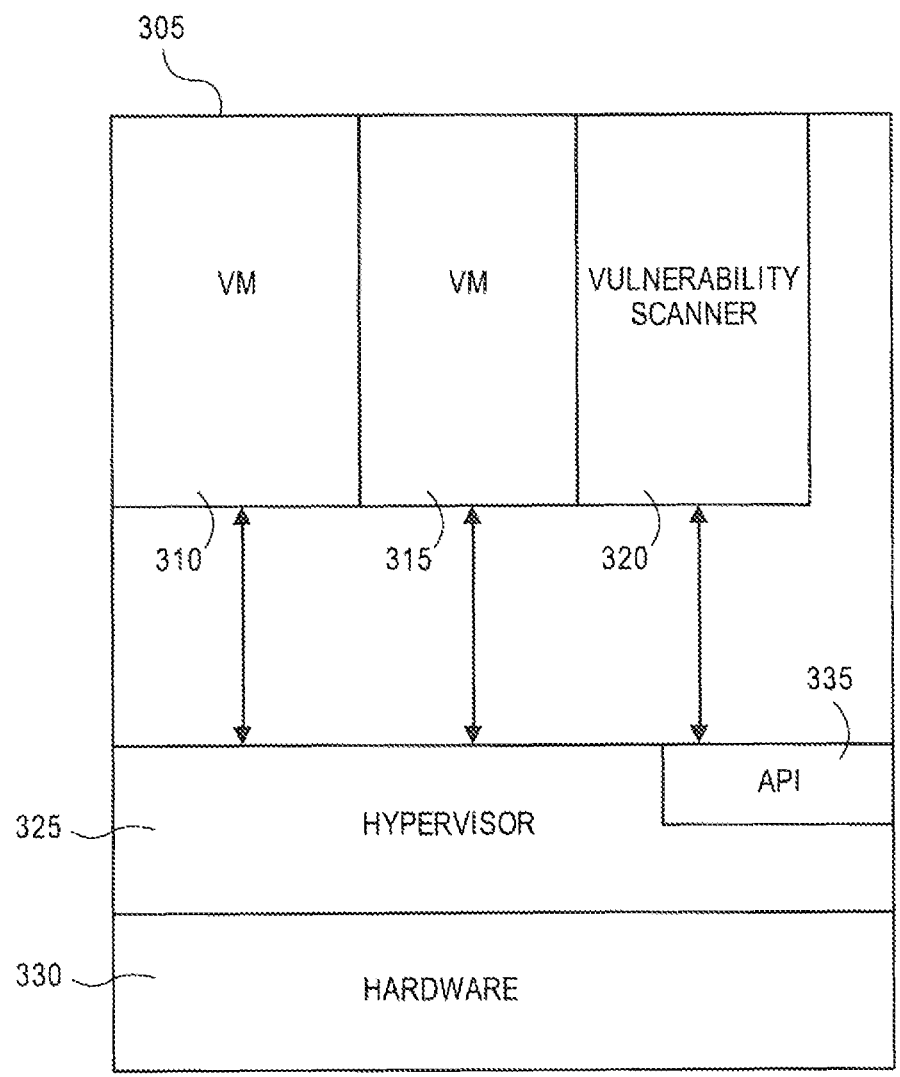
FIG. 3 is a block diagram of an exemplary configuration of a physical machine, according to various embodiments.

Referring to FIG. 3, depicted is an exemplary physical machine 305 consistent with embodiments as described herein. While FIG. 3 illustrates various components contained in the physical machine 305, one skilled in the art will realize that these components are exemplary and that the physical machine 305 can include any number and type of components.

As shown in FIG. 3, the physical machine 305 can host VMs 310, 315, and can execute or otherwise support a vulnerability scanner 320. Further, the physical machine 305 can comprise a hypervisor 325 and hardware 330. The hypervisor 325 can be a program, application, or the like that manage the operations of the VMs 310, 315 in the physical machine 305. In particular, each of the VMs 310, 315 can appear to have all of the hardware 330 (e.g. processor, memory, etc.) of the physical machine 305 all to itself. The hypervisor 325 can be configured to control the hardware 330 by allocating what is needed to each of the VMs 310, 315 to ensure that the VMs 310, 315 cannot disrupt each other. For example, each of the VMs 310, 315 can be allocated a section of the memory of the hardware 330. When one of the VMs 310, 315 requests a read from or write to the memory, the request can be sent to the hypervisor 325, which deciphers the request and creates a new request to send to the applicable section of memory.

The vulnerability scanner 320 can be installed on the physical machine 305 and can be configured to communicate with the hypervisor 325 via, for example, an API 335. More particularly, the API 335 can translate requests received from the vulnerability scanner 320 into commands or instructions compatible with the hypervisor 325. The vulnerability scanner 320 can be in an open virtualization format (OVF) or other formats. In embodiments, the vulnerability scanner 320 can be segmented on the physical machine 305 and can be prevented via, for example, firewalls and other segmentation techniques, from scanning VMs associated with other physical machines. In other embodiments, the vulnerability scanner 320 can be "pinned" or attached to the physical machine 305. In particular, when a VM running the vulnerability scanner 320 is pinned to the physical machine 305, the vulnerability scanner 320 can be confined to scan only the VMs on the physical machine 305, namely, VMs 310, 315. Further, the vulnerability scanner 320 can be prevented from moving to other physical machines or scanning other VMs or components. However, it should be appreciated that the vulnerability scanner 320 can be configured to move to other physical machines or scan other VMs or components.

According to embodiments, the vulnerability scanner 320 can be configured to scan one or both of the VMs 310, 315 for any security gaps, risks, threats, and the like. In particular, the vulnerability scanner 320 can authenticate itself with the hypervisor 325 before commencing the scan of the VMs 310, 315. For example, the vulnerability scanner 320 can retrieve credentials from a virtualization manager, such as the virtualization manager 110, to gain authorized access prior to scanning the appropriate VMs. The vulnerability scanner 320, via the hypervisor 325, can locate and examine the image in memory of the hardware 33 that corresponds to the VM that the vulnerability scanner 320 is scanning. As such, the vulnerability scanner 320 can avoid creating network packets to send to the VM being scanned. The vulnerability scanner 320 can be automatically or manually shut down or terminated after finishing a scan of the appropriate VM.

Referring back to FIG. 1, the virtual asset tool 105 can be configured to receive results of scans of the VMs 125. For example, the vulnerability scanner 130, hypervisor 325, or other component can provide a data file to the virtual asset tool 105, wherein the data file comprises the scan results. The virtual asset tool 105 can examine the scan results and identify any vulnerabilities or potential vulnerabilities identified in the scan of the VMs 125. Further, the virtual asset tool 105 can determine or identify potential remedies or solutions associated with any vulnerabilities. For example, if a hypervisor attack is identified, then the virtual asset tool 105 can request a lockdown of data flow from the corresponding physical machine 115, or other remedies. For further example, if a vulnerability is detected in one of the VMs 125, then the virtual asset tool 105 can be configured to shut down or terminate that VM 125. Further, the VM 125 can be resumed, manually or automatically, when a new vulnerability scan is needed, or in response to other triggers. It should be appreciated that the identification of other remedies and solutions associated with vulnerabilities is envisioned.

In embodiments, the virtual asset tool 105 can be configured to provide outputs associated with any of the functionalities as described herein. For example, the virtual asset tool 105 can provide updated asset records, indications of updates to any of the resources, results of scans, results of implementing solutions, and other information. For further example, the virtual asset tool 105 can be configured to provide the outputs and other information to any user, administrator, owner or other entity, in the form of charts, reports, and other types of data.

Figure 4:
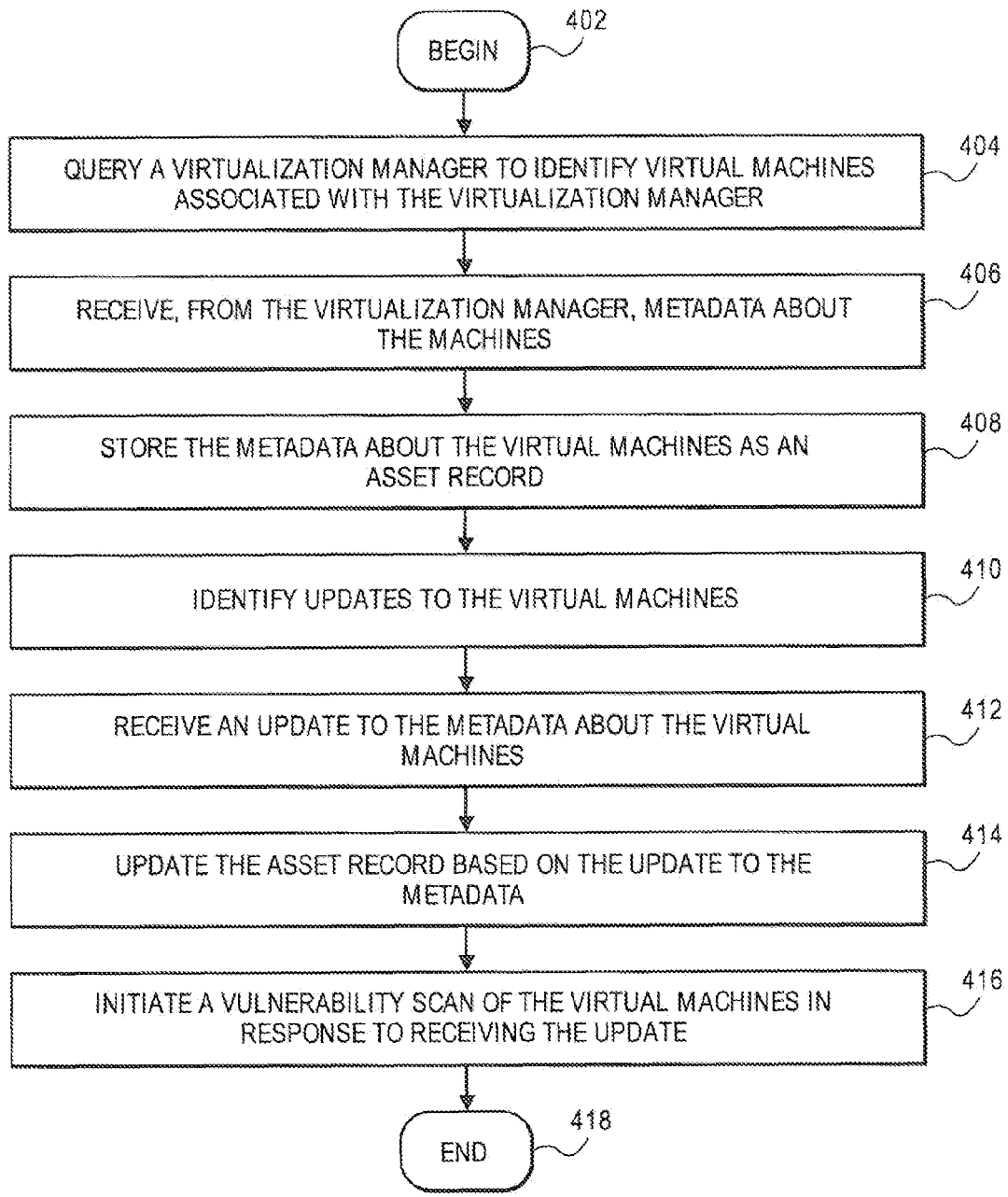
FIG. 4 is a flow diagram of exemplary processes performed by the virtual asset tool, according to various embodiments.

As discussed herein, the virtual asset tool 105 can be configured to identify and/or receive updates associated with virtual machines hosted by a physical machine. FIG. 4 is a flow diagram that illustrates an exemplary process by which the virtual asset tool 105 can use the virtualization manager 110 to identify virtual machines and receive updates to the virtual machines. In 402, the process can begin.

In 404, the virtual asset tool 105 can query a virtualization manager to identify virtual machines associated with the virtualization manager. In embodiments, the virtualization manager can manage or otherwise be associated with a plurality of physical machines, each hosting a set of virtual machines. In 406, the virtual asset tool 105 can receive metadata about the virtual machines from the virtualization manager. In embodiments, the metadata can comprise a unique identifier of each of the virtual machines, an identifier of the physical machines, an indication of a function of the virtual machines, and other data. In 408, the virtual asset tool 105 can store the metadata about the virtual machines as an asset record. In embodiments, the asset record can be stored in local or remote storage associated with the virtual asset tool 105.

In 410, the virtual asset tool 105 can identify updates to the virtual machines. In embodiments, the identification can be made via a subscription and/or a polling, and the updates can be for all of the virtual machines associated with the virtualization manager, or a subset of the virtual machines based on, for example, common properties, or other metrics. In 412, the virtual asset tool 105 can receive an update to the metadata about the virtual machines. In embodiments, the update can detail a change to one of the virtual machines or other components, indicate a new virtual machine, indicate a terminated virtual machine, or other updates.

In 414, the virtual asset tool 105 can update the asset record based on the update to the metadata. In embodiments, the update can comprise a modification of the stored metadata, as well as a deletion of existing data from the asset record or a creation of new information to add to the asset record. In 416, the virtual asset tool 105 can initiate a vulnerability scan of the virtual machines in response to receiving the update. For example, if the update indicates that a new virtual machine has been instantiated on one of the physical machines, then the vulnerability scan can be initiated on the new virtual machine.

In 418, the process can end, return to any point or repeat.

Figure 5:
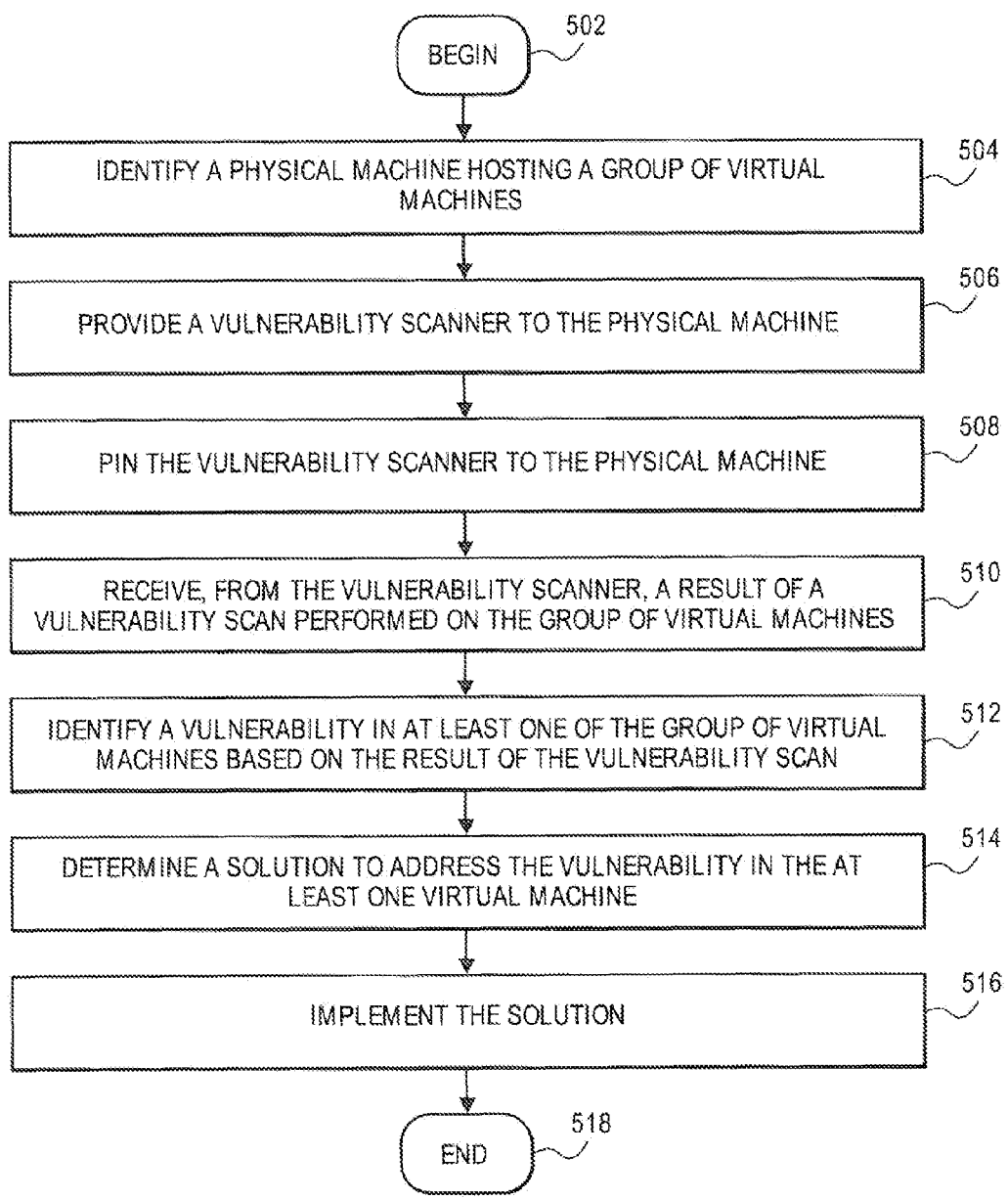
FIG. 5 is a flow diagram of other exemplary processes performed by the virtual asset tool, according to various embodiments.

As discussed herein, the vulnerability scanner 320 can be configured to scan for vulnerabilities in virtual machines hosted by a physical machine. FIG. 5 is a flow diagram that illustrates an exemplary process by which the virtual asset tool 105 can use scans performed by the vulnerability scanner 320 to analyze vulnerabilities in virtual machines hosted by physical machines. In 502, the process can begin.

In 504, the virtual asset tool 105 can identify a physical machine hosting a group of virtual machines. In embodiments, the physical machine can be identified via an indication received from a virtualization manager. In further embodiments, the indication can be received in response to the virtual asset tool 105 subscribing to updates or changes associated with the physical machine. In 506, the virtual asset tool 105 can provide a vulnerability scanner to the physical machine. In embodiments, the vulnerability scanner can be provided to the physical machine in response to an updated to the physical machine, such as, for example, if a new virtual machine is instantiated on the physical machine.

In 508, the virtual asset tool 105 can pin the vulnerability scanner to the physical machine. In embodiments, pinning the vulnerability scanner to the physical machine ensures that the vulnerability scanner only scans virtual machines associated with that physical machine. In 510, the virtual asset tool 105 can receive, from the vulnerability scanner, a result of a vulnerability scan performed on the group of virtual machines. In embodiments, the vulnerability scanner can be terminated after performing the vulnerability scan. In 512, the virtual asset tool 105 can identify a vulnerability in at least one of the group of virtual machines, based on the result of the vulnerability scan. In embodiments, the vulnerability can correspond to any type of security gap, risk, threat, and/or the like. In 514, the virtual asset tool 105 can determine a solution to address the vulnerability in the at least one virtual machine. In 516, the virtual asset tool 105 can implement the solution. In embodiments, the solution can be determined and implemented according to any technique.

In 518, the process can end, return to any point or repeat.

Figure 6:
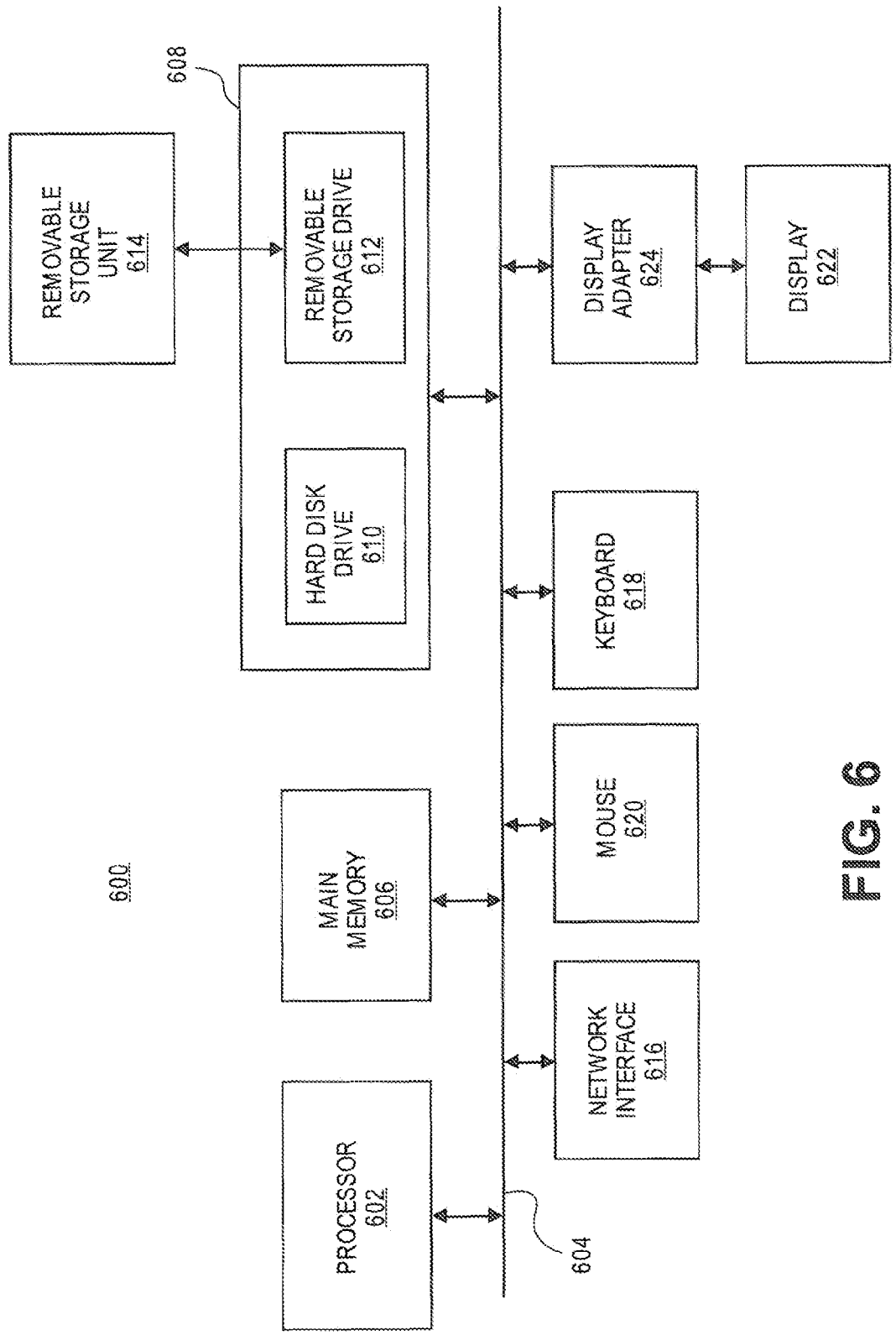
FIG. 6 is a block diagram of an exemplary computing system, according to various embodiments.

FIG. 6 illustrates an exemplary block diagram of a computing system 600 which can be implemented to store and execute the virtual asset tool 105, or other components, according to various embodiments. In embodiments, the virtual asset tool 105 can be stored and executed on the computing system 600 in order to perform the systems and methods as described herein. The computing systems 600 can represent an example of any computing systems in the environment 100. While FIG. 6 illustrates various components of the computing system 600, one skilled in the art will realize that existing components can be removed or additional components can be added.

As shown in FIG. 6, the computing system 600 can comprise one or more processors, such as processor 602 that provide an execution platform for embodiments of the virtual asset tool 105. Commands and data from the processor 602 are communicated over a communication bus 604. The computing system 600 can also comprise a main memory 606, for example, one or more computer readable storage media such as a Random Access Memory (RAM), where the virtual asset tool 105 and other application programs, such as an operating system (OS) can be executed during runtime, and can comprise a secondary memory 608. The secondary memory 608 can comprise, for example, one or more computer readable storage media or devices such as a hard disk drive 610 and/or a removable storage drive 612, representing a floppy diskette drive, a magnetic tape drive, a compact disk drive, etc., where a copy of a application program embodiment for the virtual asset tool 105 can be stored. The removable storage drive 612 reads from and/or writes to a removable storage unit 614 in a well-known manner. The computing system 600 can also comprise a network interface 616 in order to connect with any type of network, whether wired or wireless.

In embodiments, a user can interface with the computing system 600 and operate the virtual asset tool 105 with a keyboard 618, a mouse 620, and a display 622. To provide information from the computing system 600 and data from the virtual asset tool 105, the computing system 600 can comprise a display adapter 624. The display adapter 624 can interface with the communication bus 604 and the display 622. The display adapter 624 can receive display data from the processor 602 and convert the display data into display commands for the display 622.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method of vulnerability scanning in a group of virtual machines hosted by a plurality of physical machines, comprising:

identifying a physical machine from the plurality of physical machines hosting at least one virtual machine in the group of virtual machines;

providing, by a processor to the physical machine, a vulnerability scanner, wherein the vulnerability scanner is configured to scan the at least one virtual machine utilizing a hypervisor associated with the at least one virtual machine for one or more vulnerabilities that is exploitable;

receiving, from the vulnerability scanner, a result of a vulnerability scan performed on the at least one virtual machine; and identifying a vulnerability in the at least one virtual machine based on the result of the vulnerability scan.

2. The method of claim 1, further comprising:

pinning a virtual machine running the vulnerability scanner to the physical machine so that the virtual machine running the vulnerability scanner is not moved off of the physical machine.

3. The method of claim 1, wherein the vulnerability scanner uses in memory operations of the physical machine to perform the vulnerability scan.

4. The method of claim 1, wherein providing the vulnerability scanner comprises:

receiving, from a virtualization manager, an indication of a update to the physical machine; and deploying the vulnerability scanner to the physical machine in response to receiving the indication.

5. The method of claim 1, wherein the vulnerability scanner obtains credentials for the at least one virtual machine from a virtualization manager prior to performing the vulnerability scan.

6. The method of claim 1, further comprising:
querying a virtualization manager associated with the group of virtual machines to identify the group of virtual machines and the plurality of physical machines hosting the group of virtual machines.

7. The method of claim 6, further comprising:
subscribing to updates to the group of the virtual machines provided by the virtualization manager, wherein the updates to the group comprise at least one of changes in the virtual machines and identifications of new virtual machines.

8. The method of claim 7, further comprising:
receiving an update from the virtualization manager; and
initiating a new vulnerability scan based on the update received from the virtualization manager.

9. The method of claim 1, wherein providing the vulnerability scanner comprises:
instantiating the vulnerability scanner in a new virtual machine hosted by the physical machine based on results of a virtual machine discovery.

10. The method of claim 9, further comprising;
suspending the new virtual machine after a completion of the vulnerability scan; and
automatically resuming the new virtual machine when a new vulnerability scan is needed.

11. A system for vulnerability scanning in a group of virtual machines hosted by a plurality of physical machines, comprising:
a processor; and
a computer readable storage medium coupled to the processor and comprising instructions for causing the processor to perform the method comprising:
identifying a physical machine from the plurality of physical machines hosting at least one virtual machine in the group of virtual machines;
providing, to the physical machine, a vulnerability scanner, wherein the vulnerability scanner is configured to scan the at least one virtual machine utilizing a hypervisor associated with the at least one virtual machine for one or more vulnerabilities that is exploitable;
receiving, from the vulnerability scanner, a result of a vulnerability scan performed on the at least one virtual machine; and
identifying a vulnerability in the at least one virtual machine based on the result of the vulnerability scan.

12. The system of claim 11, wherein the processor further performs:
pinning a virtual machine running the vulnerability scanner to the physical machine so that the virtual machine running the vulnerability scanner is not moved off of the physical machine.

13. The system of claim 11, wherein the vulnerability scanner uses in memory operations of the physical machine to perform the vulnerability scan.

14. The system of claim 11, wherein providing the vulnerability scanner comprises:
receiving, from a virtualization manager, an indication of a update to the physical machine; and
deploying the vulnerability scanner to the physical in response to receiving the indication.

15. The system of claim 11, wherein the vulnerability scanner obtains credentials for the at least one virtual machine from a virtualization manager prior to performing the vulnerability scan.

16. The system of claim 11, wherein the processor further performs:
querying a virtualization manager associated with the group of virtual machines to identify the group of virtual machines and the plurality of physical machines hosting the group of virtual machines.

17. The system of claim 16, wherein the processor further performs:
subscribing to updates to the group of the virtual machines provided by the virtualization manager, wherein the updates to the group comprise at least one of changes in the virtual machines and identifications of new virtual machines.

18. The system of claim 17, wherein the processor further performs:
receiving an update from the virtualization manager; and
initiating a new vulnerability scan based on the update received from the virtualization manager.

19. The system of claim 11, wherein providing the vulnerability scanner comprises:
instantiating the vulnerability scanner in a new virtual machine hosted by the physical machine based on results of a virtual machine discovery.

20. The system of claim 19, wherein the processor further performs:
suspending the new virtual machine after a completion of the vulnerability scan; and
automatically resuming the new virtual machine when a new vulnerability scan is needed.

21. A non-transitory computer readable storage medium embodying instructions for causing a processor to perform the method comprising:
identifying a physical machine from a plurality of physical machines hosting at least one virtual machine in a group of virtual machines;
providing, to the physical machine, a vulnerability scanner, wherein the vulnerability scanner is configured to scan the at least one virtual machine utilizing a hypervisor associated with the at least one virtual machine for one or more vulnerabilities that is exploitable;
receiving, from the vulnerability scanner, a result of a vulnerability scan performed on the at least one virtual machine; and
identifying a vulnerability in the at least one virtual machine based on the result of the vulnerability scan.

22. The non-transitory computer readable storage medium of claim 21, wherein the processor further performs:
pinning a virtual machine running the vulnerability scanner to the physical machine so that the virtual machine running the vulnerability scanner is not moved off of the physical machine.

23. The non-transitory computer readable storage medium of claim 21, wherein the vulnerability scanner uses in-memory operations of the physical machine to perform the vulnerability scan.

24. The non-transitory computer readable storage medium of claim 21, wherein providing the vulnerability scanner comprises:
receiving, from a virtualization manager, an indication of a update to the physical machine; and
deploying the vulnerability scanner to the physical in response to receiving the indication.

25. The non-transitory computer readable storage medium of claim 21, wherein the vulnerability scanner obtains credentials for the at least one virtual machine from a virtualization manager prior to performing the vulnerability scan.

26. The non-transitory computer readable storage medium of claim 21, wherein the processor further performs:

querying a virtualization manager associated with the group of virtual machines to identify the group of virtual machines and the plurality of physical machines hosting the group of virtual machines.

27. The non-transitory computer readable storage medium of claim 26, wherein the processor further performs:
subscribing to updates to the group of the virtual machines provided by the virtualization manager, wherein the updates to the group comprise at least one of changes in the virtual machines and identifications of new virtual machines.

28. The non-transitory computer readable storage medium of claim 27, wherein the processor further performs:
receiving an update from the virtualization manager; and
initiating a new vulnerability scan based on the update received from the virtualization manager.

29. The non-transitory computer readable storage medium of claim 21, wherein providing the vulnerability scanner comprises:
instantiating the vulnerability scanner in a new virtual machine hosted by the physical machine based on results of a virtual machine discovery.

30. The non-transitory computer readable storage medium of claim 29, wherein the processor further performs:
suspending the new virtual machine after a completion of the vulnerability scan; and
automatically resuming the new virtual machine when a new vulnerability scan is needed.

* * * * *